United States Patent [19]
Rinker

[11] Patent Number: 5,113,606
[45] Date of Patent: May 19, 1992

[54] SCENTED LURE

[76] Inventor: David E. Rinker, P.O. Box 5206, Cottonwood, Calif. 96022

[21] Appl. No.: 617,965

[22] Filed: Nov. 23, 1990

Related U.S. Application Data

[63] Continuation-in-part of Ser. No. 449,601, Dec. 12, 1989, abandoned.

[51] Int. Cl.⁵ .................................................. A01K 85/00
[52] U.S. Cl. ............................................ 43/42.19; 43/42.06
[58] Field of Search ................. 43/42.06, 42.15, 42.16, 43/42.17, 42.18

[56] References Cited

U.S. PATENT DOCUMENTS

| | | | |
|---|---|---|---|
| 1,222,774 | 4/1917 | Leonard | 43/42.15 |
| 3,987,576 | 10/1976 | Strader | 43/42.19 |
| 4,133,134 | 1/1979 | Cheng | 43/42.06 |
| 4,208,824 | 6/1980 | Maxwell | 43/42.19 |
| 4,703,579 | 11/1987 | Kay | 43/42.19 |
| 4,730,410 | 3/1988 | Sobieniak | 43/42.17 |
| 4,736,542 | 4/1988 | Floyd | 43/42.06 |
| 4,744,167 | 5/1988 | Steele | 43/42.06 |
| 4,884,359 | 12/1989 | Wray | 43/42.19 |

Primary Examiner—Kurt Rowan
Attorney, Agent, or Firm—Joseph E. Gerber

[57] ABSTRACT

A scented lure is provided having a shaft connectable to a fishing line, a spoon lure for attracting fish visually and a bead and bearing combination between which scenting material is positioned. Additional scenting capability is provided by the use of a hollow sleeve which fits over the shaft and into which scenting material is inserted.

8 Claims, 2 Drawing Sheets

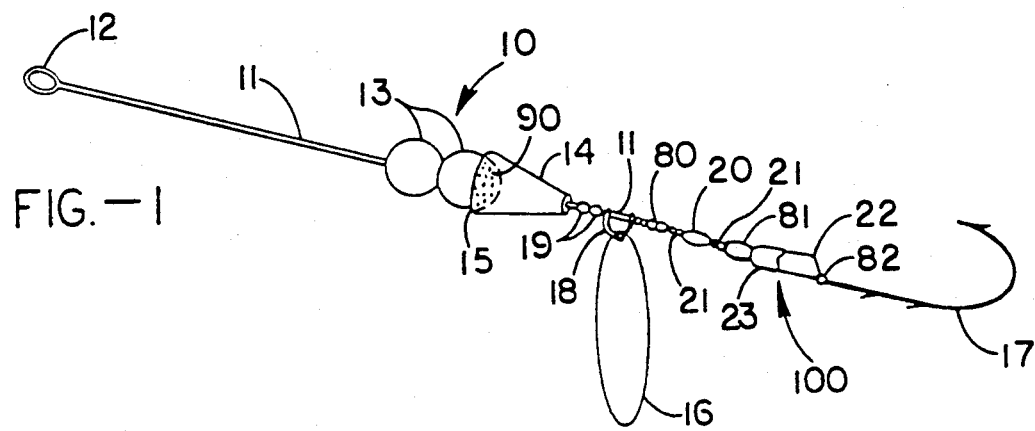
FIG.—1
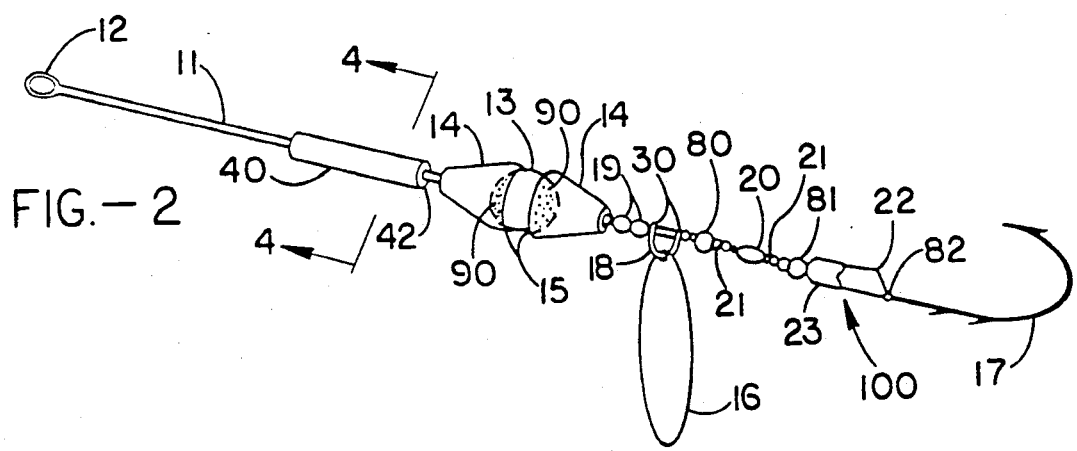
FIG.—2
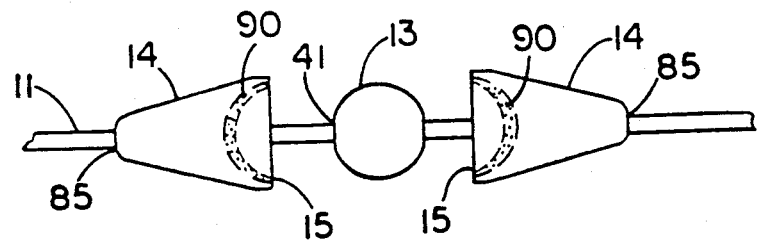
FIG.—3
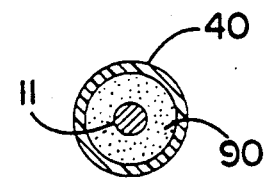
FIG.—4

SCENTED LURE

This a contintuation-in-part of Ser. No. 07/449,601 filed Dec. 12, 1989, now abandoned.

BACKGROUND OF THE INVENTION

1. Field of the Invention

The present invention relates generally to lures for use in fishing and more specifically to a scented lure capable of attracting fish by both olfactory and visual means.

2. Description of the Prior Art

Past inventors have directed their efforts toward the construction of lures having different colors and different types of shiny surfaces to attract fish. Other inventors have directed their efforts toward the use of scented material in order to attract the fish by scent. While many such lures have been created, none of the prior art of which applicant is aware has taught a scented lure constructed in the way in which the present invention is constructed and having the unique features of the present invention.

SUMMARY OF THE INVENTION

The present invention consists of a scented lure which utilizes a shaft having at least one large bead against which a bearing fits. The bearing has a recess designed to partially accept the bead and into which a scented material may be positioned during fishing. The scented lure may include a spoon lure attached to the shaft by a clevis or other acceptable attaching means, and further includes an attaching means whereby a hook may be attached to the end of the scented lure. The scented lure may further include a second bearing as just mentioned, each of the bearings having a recess and each positioned on an opposite side of the bead. The lure may also include a hollow sleeve positioned over the shaft and having a hole of sufficiently large size to facilitate positioning of scenting material therein.

One of the objects of the present invention is to provide a scented lure having multiple possibilities of scenting, as well as a spoon-type lure to attract fish by visual means.

Another object of the present invention is to provide a scented lure which is easily attached to and detached from a hook.

A further object of the present invention is to provide a scented lure which may be modified to increase or decrease the release of the scented material.

The foregoing objects, as well as other objects and benefits of the present invention, are made more apparent by the descriptions and claims which follow.

BRIEF DESCRIPTION OF THE DRAWINGS

FIG. 1 is a perspective view of the scented lure of the present invention.

FIG. 2 is a perspective view of an alternative embodiment of the scented lure of the present invention.

FIG. 3 is a side view showing the structure of bearings utilized in the scented lure of the present invention.

FIG. 4 is an enlarged cross-sectional view taken on lines 4—4 of FIGS. 2 and 6.

DESCRIPTION OF THE PREFERRED EMBODIMENTS

Figure 5:
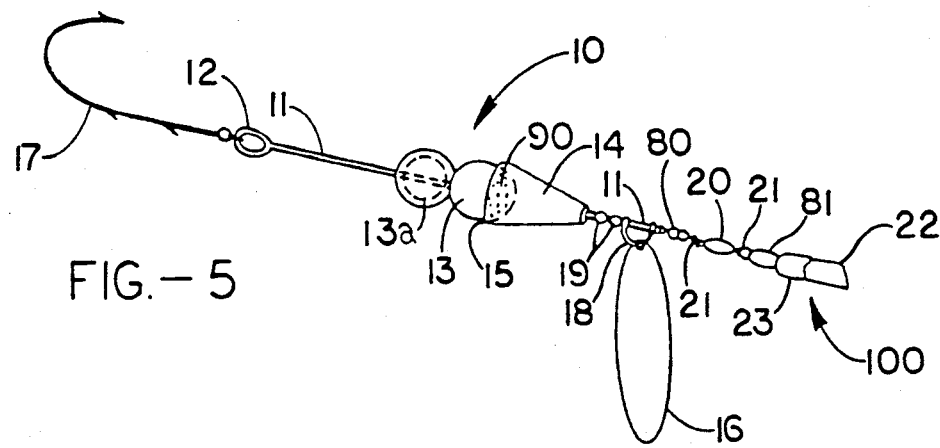
FIG. 5 is a perspective view of an alternative embodiment of the lure of the present invention, similar to that of FIG. 1, but having its hook and line attaching ends reversed.

FIG. 1 of the drawings shows a scented lure of the present invention. Scented lure 10 consists of a shaft 11 having a loop 12 at one end to which a fishing line may be attached. Further, the lure may include a pair of beads 13 positioned on shaft 11, with one of beads 13 being positioned against and into a recess 15 of bearing 14. The recess 15 of bearing 14 is sufficiently large to accept paste-type scented material 90. A pair of bearing beads 19 is provided between bearing 14 and clevis 18, to which a spoon lure 16 is attached to facilitate movement of clevis 18 with respect to bearing 14. A barrel swivel 20 is connected by one of its connectors 21 to loop 80 of shaft 11, and to a connecting means 100 consisting of loop 81, base 23 and loop 22 by means of its other connector 21. The fisherman may attach a hook 17 to loop 22 of connecting means 100 by passing it through loop 82 of hook 17. Alternatively, hook 17 may be attached to loop 12 at the opposite end o the lure, as by a split ring, or the like, as shown in FIG. 5. And, a fishing line may be attached to loop 22.

Figure 6:
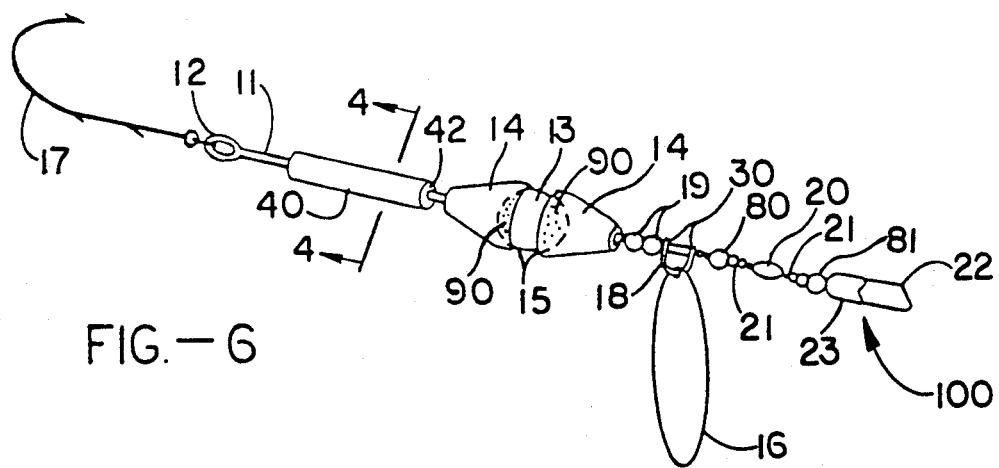
FIG. 6 is a perspective view of an alternative embodiment of the lure of the present invention, similar to that of FIG. 2, but having its hook and line attaching ends reversed.

FIG. 2 is a perspective view showing the scented ted lure 10 of FIG. 1 with one of the beads 13 removed and a second bearing 14 positioned against the remaining bead 13 so that a bearing 14 is positioned on each side of the bead 13. Thus, more scenting material 90 may be positioned in recesses 15 of bearings 14. A hollow sleeve 40 is positioned on shaft 11 and may be constructed of a brightly-colored material to attract fish. However, the primary feature of hollow sleeve 40 is that it has a hole 42 therein large enough to facilitate positioning of a paste-type scenting material 90 therein, as shown in FIG. 4. The remainder of the structure of scented lure 10 as shown in FIG. 2 is substantially the same as that of FIG. 1. As above, hook 17 in this embodiment may, alternatively, be attached to loop 12 at the opposite end of the lure as shown in FIG. 6. And, a fishing line may be attached to loop 22. Clevis 18 is attached to shaft 11 by means of shaft 11 passing through holes 30 of clevis 18.

FIG. 3 of the drawings shows the structure of bearings 14 in greater detail. Bearings 14 have recesses 15 positioned therein which are designed to fit around bead 13. Recesses 15 are large enough to facilitate positioning of a paste-type scenting material 90 therein. Bearings 14 have holes 85 therethrough to facilitate insertion of shaft 11 therethrough. The inventive lure herein also has means for carrying an alternative scenting material, that being liquid scenting material. As show in FIG. 5, bead 13a is hollow and slidably mounted on shaft 11. Liquid scenting material (not shown) may be injected into the hole in hollow bead 13a where shaft 11 passes through. This is easily accomplished with a hypodermic needle or other fine-tipped instrument. Best results are realized if the bead is agitated somewhat after the scenting material is injected, in order to coat ints inner walls with the scent. Then, upon the lure's being drawn through the water, the liquid scenting material washes out slowly to attract fish. It should be understood that hollow bead 13a may be substituted before any bead 13 shown in the drawings herein.

While the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A scented lure, comprising:
a shaft having a first end and a second end;
first connecting means positioned at said first end of said shaft for connecting said shaft to a fishing line;
second connecting means positioned at said second end of said shaft for connecting said shaft to other fishing equipment;
a slidable bead having a hole therein through which said shaft passes, positioned between said first and second ends of said shaft;
a first bearing positioned between said slidable bead and said first end of said shaft, having a first surface which faces said slidable bead, said first surface having a first recess into which scenting material is inserted and which substantially conforms to said bead,
a second bearing positioned between said slidable bead and said second end of said shaft, having a second surface which faces said slidable bead, said second surface having a second recess into which scenting material is inserted and which substantially conforms to said bead; and,
a spoon lure attached to said shaft between said second bearing and said second end of said shaft.

2. The scented lure of claim 1, including a hollow sleeve positioned between said first end of said shaft and said first bearing, having a hole through which said shaft fits into which scenting material is inserted.

3. The scented lure of claim 1 wherein said slidable bead is hollow and able to receive a liquid scenting material, and also able to permit said liquid scenting material to be washed out as said lure is drawn through water.

4. A scented lure, comprising:
a shaft having a first end and a second end;
first connecting means positioned at said first end of said shaft for connecting said shaft to a fishing line;
second connecting means positioned at said second end of said shaft for connecting said shaft to other fishing equipment;
a slidable bead having a hole therein through which said shaft passes, positioned between said first and second ends of said shaft;
a hollow sleeve positioned between said first end of said shaft and said bead, having a hole through which said shaft fits into which scenting material is inserted;
a bearing positioned between said slidable bead and said second end of said shaft, shaving a first surface which faces said slidable bead, said first surface having a first recess into which scenting material is inserted and which substantially conforms to said bead; and,
a spoon lure attached to said shaft between said bearing and said second end of said shaft.

5. A scented lure, comprising:
a shaft having a first end and a second end;
first connecting means positioned at said first end of said shaft for connecting said shaft to a fishing line;
second connecting means positioned at said second end of said shaft for connecting said shaft to other fishing equipment;
a slidable bead having a hole therein through which said shaft passes, positioned between said first and second ends of said shaft;
a first bearing positioned between said slidable bead and said first end of said shaft, having a first surface which faces said slidable bead, said first surface having a first recess into which scenting material is inserted and which substantially conforms to said bead,
a second bearing positioned between said slidable bead and said second end of said shaft, having a second surface which faces said slidable bead, said second surface having a second recess into which scenting material is inserted and which substantially conforms to said bead; and,
a spoon lure attached to said shaft between said fist bearing and said first end of said shaft.

6. The scented lure of claim 5, including a hollow sleeve positioned between said second end of sad shaft and said second bearing, having a hole through which said shaft fits into which scenting material is inserted.

7. The scented lure of claim 5 wherein said slidable bead is hollow and able to receive a liquid scenting material, and also able to permit said liquid scenting material to be washed out as said lure is drawn through water.

8. A scented lure, comprising:
a shaft having a first end and a second end;
first connecting means positioned at said first end of said shaft for connecting said shaft to a fishing line;
second connecting means positioned at said second end of said shaft for connecting said shaft to other fishing equipment;
a slidable bead having a hole therein through which said shaft passes, positioned between said first and second ends of said shaft;
a bearing positioned between said slidable bead and said first end of said shaft, having a first surface which faces said slidable bead, said first surface having a first recess into which scenting material is inserted and which substantially conforms to said bead;
a hollow sleeve positioned between said second end of said shaft and said bead, having a hole through which said shaft fits into which scenting material is inserted; and,
a spoon lure attached to said shaft between said bearing and said first end of said shaft.

* * * * *